United States Patent [19]
Dax et al.

[11] Patent Number: 5,400,697
[45] Date of Patent: Mar. 28, 1995

[54] ELECTRIC TOASTER

[75] Inventors: Michael Dax, Altfraunhofen; Maximilian Beutlrock, Kienberg; Werner Reith, Munich, all of Germany

[73] Assignee: Bosch-Siemens Hausgeraete GmbH, Munich, Germany

[21] Appl. No.: 172,838

[22] Filed: Dec. 23, 1993

[30] Foreign Application Priority Data

Dec. 23, 1992 [DE] Germany ............... 42 43 933.0

[51] Int. Cl.⁶ .................................. A47J 37/08
[52] U.S. Cl. ....................... 99/389; 99/385; 99/401; 99/447; 392/424
[58] Field of Search ........... 99/389, 340, 385, 393, 99/401, 447; 219/521, 443, 377, 400, 531, 386; 392/423, 424, 408

[56] References Cited

U.S. PATENT DOCUMENTS

| | | | |
|---|---|---|---|
| 3,358,584 | 12/1967 | Sutton et al. | 99/401 |
| 4,345,513 | 8/1982 | Holt | 99/401 |
| 4,491,066 | 1/1985 | Juriga et al. | 99/401 |
| 4,892,997 | 1/1990 | McWilliams | 219/461 |
| 4,972,768 | 11/1990 | Basora San Juan | 99/393 |
| 5,196,674 | 3/1993 | Chartrain et al. | 392/424 |
| 5,237,913 | 8/1993 | Hahnewald et al. | 99/447 |

FOREIGN PATENT DOCUMENTS

| | | | |
|---|---|---|---|
| 251729 | 10/1988 | Japan | 392/423 |
| 269830 | 10/1989 | Japan | 392/423 |

*Primary Examiner*—David A. Scherbel
*Assistant Examiner*—Patrick F. Brinson
*Attorney, Agent, or Firm*—Herbert L. Lerner; Laurence A. Greenberg

[57] ABSTRACT

An electric toaster includes a grate heating body having a reflector. A barlike heating element is disposed in front of the reflector. A shielding device is disposed in front of the heating element. The shielding device includes a field having a plurality of spaced-apart substantially round or polygonal shielding bars with a reflective surface extending approximately parallel to the heating bar and to one another.

24 Claims, 2 Drawing Sheets

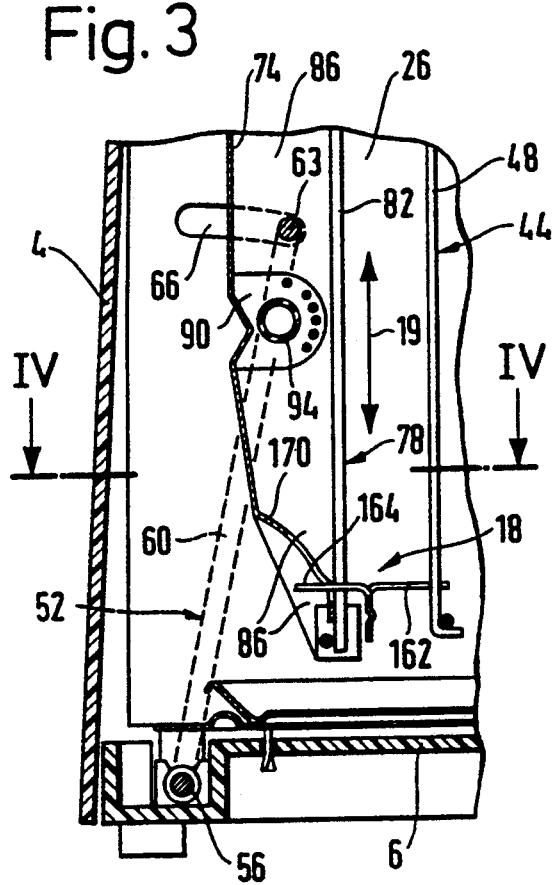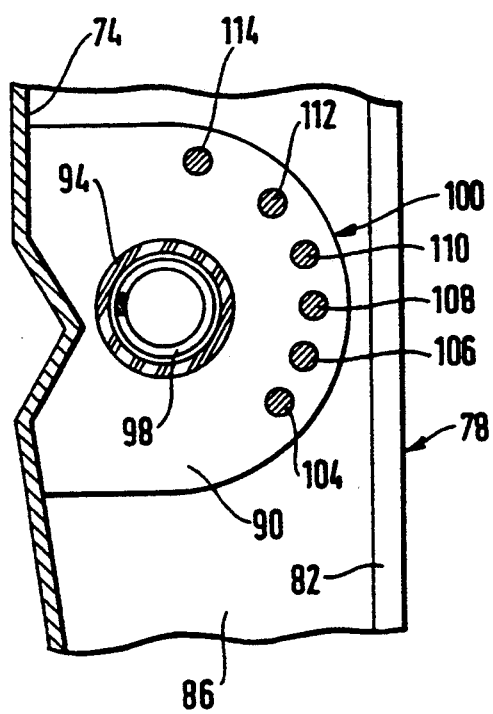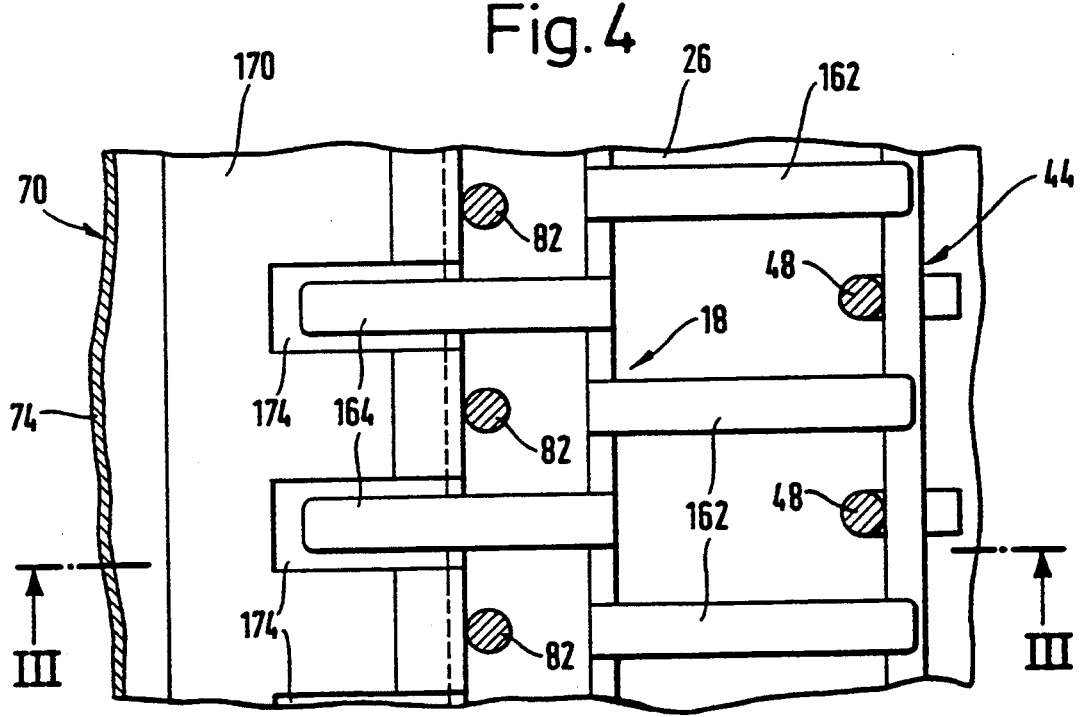

ELECTRIC TOASTER

BACKGROUND OF THE INVENTION

Field of the Invention

The invention relates to an electric toaster having a grate heating body that has a reflector, a barlike heating element disposed in front of the reflector, and a shielding device disposed in front of the heating element.

Such a toaster is known from Published German Application DE 21 54 748. The shielding device in that toaster includes a sheet-metal strip with stamped openings. Such a shielding device has the disadvantage of being heated so severely that the thermal radiation it gives off once again results in uneven toasting of the product being toasted.

SUMMARY OF THE INVENTION

It is accordingly an object of the invention to provide an electric toaster, which overcomes the hereinaforementioned disadvantages of the heretofore-known devices of this general type and which does so in such a way that it has a simple structure and it achieves a more-even degree of toasting over the entire surface of the product to be toasted.

With the foregoing and other objects in view there is provided, in accordance with the invention, an electric toaster, comprising a grate heating body having a reflector, a barlike heating element disposed in front of the reflector, and a shielding device disposed in front of the heating element, the shielding device including a field having a plurality of spaced-apart substantially round or polygonal shielding bars with a reflective surface extending approximately parallel to the heating bar and to one another.

This embodiment has the advantage of attaining an unexpectedly good evening out of the degree of toasting, so that the heating element can be brought close to the surface of the product to be toasted, which overall makes possible a more-compact structure of the toaster. This is especially true with a bread toaster with two vertical toasting chambers located next to one another. As a result, the toaster can be made markedly narrower. Bars with a polygonal cross section can also be considered to be "substantially round" shielding bars, because in general their reflection performance is not essentially different from that of a round bar.

In accordance with another feature of the invention, the field of the shielding bars is disposed in a curved surface, especially a cylindrical surface, extending over a portion of the heating bar. This is important above all for good distribution of the radiation of thick heating bars, having radiation which is distributed over an entire surface of the product to be toasted, such as a whole slice of bread.

In accordance with a further feature of the invention, in the case of vertical toasting chambers, as in conventional electric toasters, the field of the shielding bars is shifted upward and disposed asymmetrically with respect to the midpoint along the height of the bar heating body, to compensate for the toasting action of the hot air rising in the toasting chamber in the upper regions of the product being toasted.

In accordance with an added feature of the invention, the spacings between the shielding bars increase downward and in particular upward from the midway point of the height of the heating bar, and as a result further evening out of the degree of toasting is obtained.

In accordance with a concomitant feature of the invention, the shielding bars are hollow, which reduces their heat storing capacity and prevents uneven degrees of toasting when toasting operations are performed in rapid succession.

Other features which are considered as characteristic for the invention are set forth in the appended claims.

Although the invention is illustrated and described herein as embodied in an electric toaster, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a fragmentary, sectional view corresponding to that of FIG. 2, showing the toaster with bread holder slides fully lowered;

FIG. 4 is a fragmentary, cross-sectional view taken substantially along a line IV—IV of FIG. 3, in the direction of the arrows; and FIG. 5 is a fragmentary, enlarged view of a portion of FIG. 3.

DESCRIPTION OF THE PREFERRED EMBODIMENTS

Figure 1:
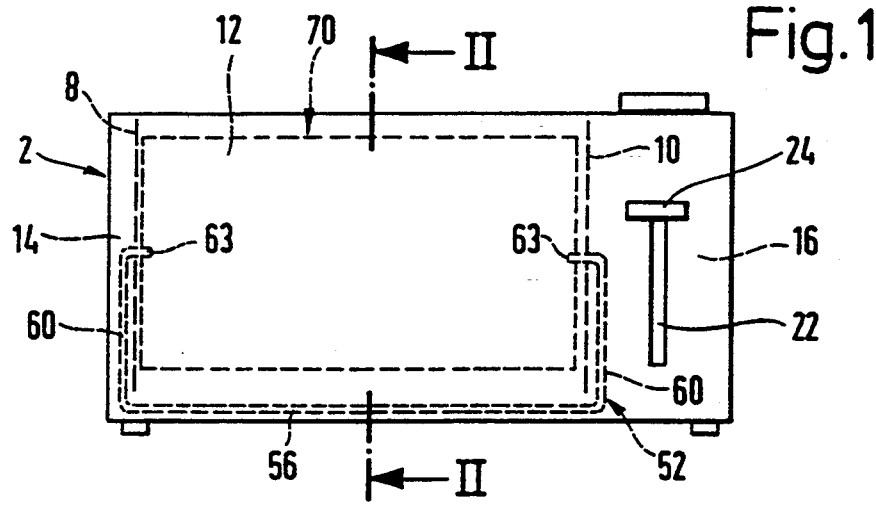
FIG. 1 is a diagrammatic, side-elevational view of a bread toaster.
Figure 2:
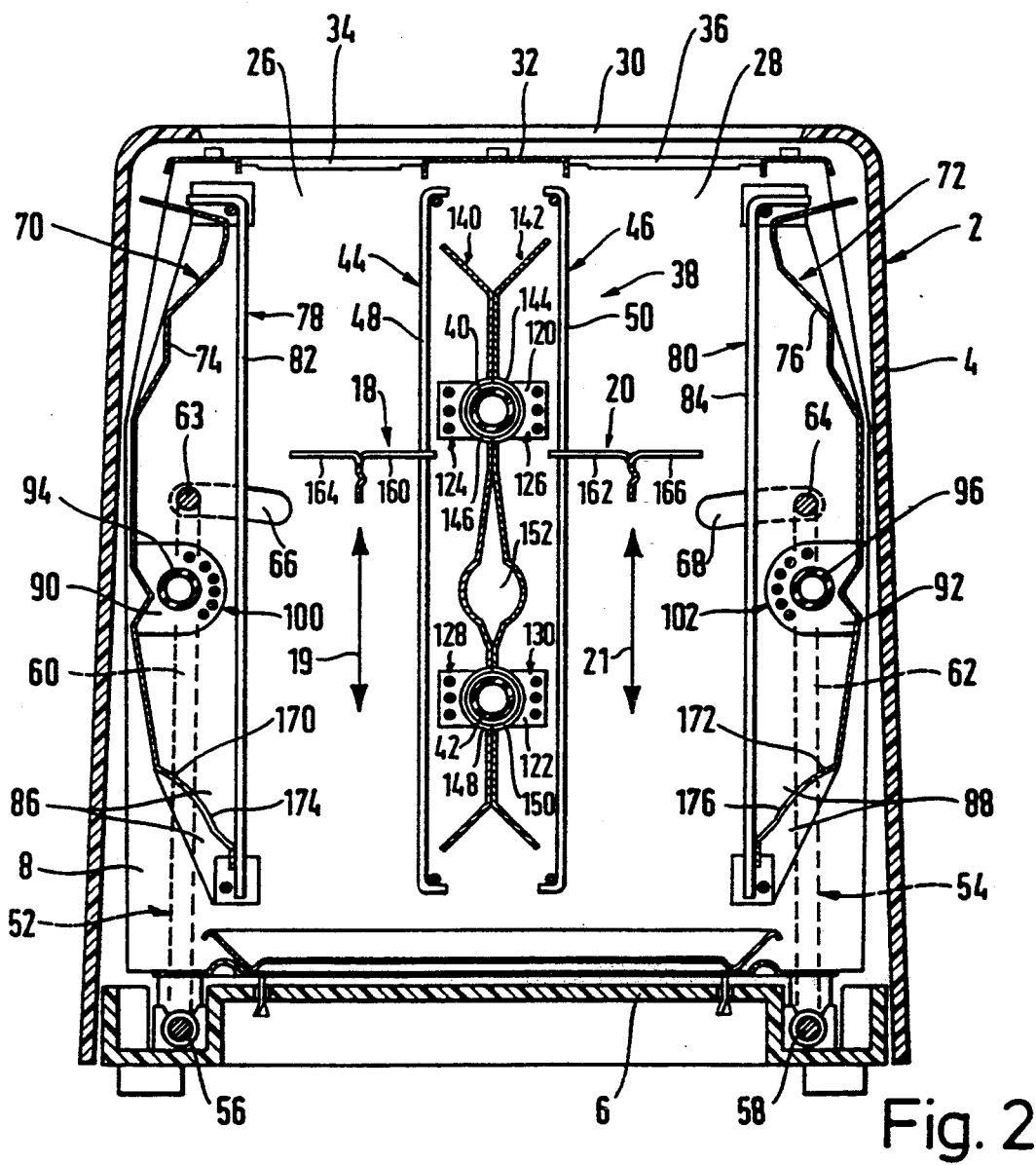
FIG. 2 is an enlarged, longitudinal-sectional view taken substantially along a line II—II of FIG. 1, in the direction of the arrows.

Referring now to the figures of the drawing in detail and first, particularly, to FIGS. 1 and 2 thereof, there is seen a bread toaster that has an outer housing 2 which includes a hood 4 and a bottom 6 of plastic and which is subdivided by crosswise sheet-metal partitions 8 and 10 into a toasting region 12 and control chambers 14 and 16 in end surface regions. The wider control chamber 16 includes a non-illustrated control slide that supports two bread holder slides 18 and 20 and can be lowered by means of a handle 24 that protrudes through a vertical slit 22 in the housing 2.

The toasting region 12 is subdivided into two toasting chambers 26 and 28 that are located side by side, in which the bread holder slides 18 and 20, that can be displaced vertically in the direction of arrows 19 and 21, are disposed. In the toasting region 12, the hood 4 has a large top opening 30 formed therein, below which a cover plate 32 of sheet metal is disposed, in order to join the two crosswise partitions 8 and 10. This opening has insertion and discharge slits 34 and 36 above the toasting chambers 26 and 28. A middle grate heating body 38, having two heating bars 40 and 42 of quartz glass that are located one above the other and having two vertical protective grids 44 and 46 with vertical grid bars 48 and 50, is fixedly disposed between the toasting chambers 26 and 28. Two swivel brackets 52 and 54 are supported on the bottom plate 6 with middle connecting struts 56 and 58 extending longitudinally of the toaster. In the control segments 14 and 16 of the housing 2 each of the swivel brackets 52 and 54 has one upwardly protruding arm 60, 62, which with a respective horizontally bent upper end segment 63 and 64 reaches through oblong slots 66 and 68 and each carries one respective outer grate heating body 70 and 72 pivotably connected to it, in each case halfway up the height of the heating body.

The outer grate heating bodies 70 and 72 each have a respective reflector 74 and 76 with upper and lower regions that protrude toward the interior of the respective toasting chamber 26 and 28 and that are spanned over their entire height by a protective grid 78 and 80 with respective essentially vertically extending grid bars 82 and 84. The protective grids 78 and 80 and the reflectors 74 and 76 are each joined on their long ends by narrow end walls, of which only end walls 86 and 88 can be seen, adjacent the crosswise partition 8. Somewhat below a midway point of the height of the end walls, on the side toward the interior of the toasting region 12, ceramic support elements are provided, of which only support elements 90 and 92 can be seen. The support elements carry heating bars in the form of quartz radiators 94 and 96, which extend horizontally between the reflectors 74 and 76 and the protective grids 78 and 80 disposed in front of them.

As is seen in FIG. 5, the quartz radiators 94 and 96 include a quartz glass tube, in which a coiled electric heating conductor 98 is disposed. Part of the electric heating conductor 98 is left out of the drawings for the sake of simplification. The ceramic support elements 90 and 92, together with their non-illustrated counter parts, also each carry one respective field 100 and 102 extending on a cylindrical surface around the heating bars 94 and 96, as is seen in FIG. 2. The fields include shielding bars 104–114 as is shown on a larger scale in FIG. 5. The shielding bars 104–114 are solid bars of stainless steel with a circular cross section and a surface that reflects the heat radiation. However, in a modified, non-illustrated embodiment the shielding bars may also be tubular or in the form of U-shaped profiles with an opening pointing away from the heating bar. The shielding bars 104–114 extend horizontally and parallel to the respective heating bars 94 and 96. An axis of the middle shielding bar 108 is located at the same level as an axis of the heating bar 94. Below it, the two shielding bars 106 and 104 are disposed at angles of 20° and 40°, as measured from the midway point of the height, about the center axis of the heating bar 94. From the midway point of the height, the three further shielding bars 110, 112 and 114 are disposed toward the top at angles of 20°, 43° and 77°, as measured from the midway point of the height. The diameter of the cylindrical shielding bars 104–114 is dimensioned in such a way that the three middle shielding bars 106–110 that are located closest to the bars 82 of the protective grid 78 and therefore to the product to be toasted are spaced apart from one another by a distance that amounts to approximately 80% of the diameter of the shielding bars. With this dimensioning, a particularly uniform degree of toasting of the product to be toasted is attained despite an especially flat construction of the grate heating bodies 70 and 72 and thus an overall narrow appliance. The flat structure of the grate heating bodies means that the heating bars 94 and 96 must be disposed especially close to the product to be toasted, and therefore the danger of uneven toasting is especially great.

The danger of uneven toasting is less with the heating bars 40 and 42 of the middle grate heating body, since with these thinner heating bars the output is distributed more uniformly over the surface of the product to be toasted that is to be exposed. The heating bars 40 and 42 are secured to the crosswise partitions 8 and 10 in ceramic support elements 120 and 122 that protrude toward the sides and that each define a respective field 124, 126, 128 and 130 toward the two toasting chambers 26 and 28. Each field includes three shielding bars disposed one above the other in a vertical plane, which correspond to the shielding bars 104–114. The fields each extend over the entire height of the heating bars 40 and 42, and each three shielding bars are spaced apart by equal distances from one another. The middle grate heating body moreover has two reflector baffles 140 and 142, which are formed in mirror symmetry with one another and have large openings in the region of the bar heating bodies 40 and 42, through which openings the bar heating bodies can shine or radiate.

The parts located between and above and below the bar heating bodies 40 and 42 are only connected to one another in the region of the bar heating bodies by a few remaining strips 144, 146, 148 and 150, which makes assembly easier. The reflector baffles are also in contact with one another adjacent the heating bars 40 and 42 and are spread apart at their upper and lower end segments by an angle of approximately 90°, while in their middle region they are bent apart to make a pouch 152 of approximately pear-shaped cross section.

If the distance between the bar heating bodies 40 and 42 is divided into four parts, then the pouch is located in the second fourth from the bottom below the middle.

The bread holder slides 18 and 20 have bearing tines 160 and 162 protruding partway between the grid bars 48 and 50 of the middle grate heating body and horizontally toward that body, and bearing tines 164 and 166 that protrude outward. The outer bearing tines 164 and 166 are distributed longitudinally of the appliance in such a way that, as is shown in FIG. 4 for the grate heating body 70 being swiveled maximally inward, they can reach between its grid bars 82. Moreover, lower end regions 170 and 172 of the reflector baffles 74 and 76, which protrude as far as the grid bars 82 and 84, each have a row of windows 174 and 176, which can be engaged by the outer bearing tines 164 in the lowered state or during lowering, if the outer grate heating bodies 70 and 72 are swiveled far inward, as is the case, for instance, if the product to be toasted is very thin. This is shown in FIGS. 3 and 4.

The swiveling motions of the outer grate heating bodies 70 and 72 are effected through the swiveling brackets 52 and 54. As in the construction shown in Published French Application No. 20 69 381, a non-illustrated control slide that is vertically displaceable in the control chamber or section 16 of the housing 2 and carries the bread holder slides 18 and 20, cooperates by means of control protrusions with the arms or legs 60 and 62 of a rocker. As a result, the outer grate bodies 70 and 72 are forced maximally apart, as is shown in FIG. 2, in order to receive the product to be toasted while the bread holder slides 18 and 20 are raised. If the non-illustrated control slide is lowered by pressing down the handle 24, then the bread holder slides 18 and 20 first move some distance downward, while the spacing of the grate heating bodies 70 and 72 remains the same, until the control slide enters further spaced apart lower segments of the swivel arms 60 and 62, and a non-illustrated tension spring which connects the upper end segments 63, 64, can pull the grate heating bodies 70 and 72 together upon further downward motion of the control slide, until these bodies rest with their protective grids 78 and 80 against the product to be toasted and press it against the protective grids 44 and 46 of the middle grate heating body.

We claim:

1. An electric toaster, comprising:
    a housing, said housing having a toasting chamber formed therein;
    a grate heating body with a reflector attached to said housing and disposed at a wall of said toasting chamber, a barlike heating element attached to said housing and disposed in front of said reflector in a direction from the wall into said toasting chamber, and a shielding device attached to said housing and disposed in front of said heating element in the direction from the wall into said toasting chamber, said shielding device including a field having a plurality of spaced-apart shielding bars with a reflective surface extending approximately parallel to said heating bar and to one another.

2. The toaster according to claim 1, wherein said shielding bars are substantially round.

3. The toaster according to claim 1, wherein said shielding bars are substantially polygonal.

4. The toaster according to claim 1, wherein said shielding bars have a circular cross section.

5. The toaster according to claim 1, wherein said field has a circular cross section being at least approximately equal to the diameter of said heating bar.

6. The toaster according to claim 1, wherein said field is disposed in a curved surface around a portion of the circumference of said heating bar.

7. The toaster according to claim 6, wherein said curved surface is cylindrical.

8. The toaster according to claim 1, wherein said field is disposed around said heating bar, as seen in section.

9. The toaster according to claim 8, wherein said field is disposed approximately over an angle of 80° to 160° around said heating bar.

10. The toaster according to claim 8, wherein said field is disposed approximately over an angle of 90° to 120° around said heating bar.

11. The toaster according to claim 1, wherein said heating bar and said shielding bars extend horizontally.

12. The toaster according to claim 1, including a vertical bread toasting chamber, said grate heating body extending over the entire height of said toasting chamber, and said heating bar being a single bar horizontally disposed midway up the height of said grate heating body.

13. The toaster according to claim 1, including another heating bar, said field of said shielding bars being shifted upward and disposed asymmetrically relative to a midway point of the height of said heating bars.

14. The toaster according to claim 1, including another heating bar, said field extending downward from a midway point of the height of said heating bars over an angle of approximately 30° to 50° around said heating bars.

15. The toaster according to claim 1, including another heating bar, said field extending downward from a midway point of the height of said heating bars over an angle of approximately 45° around said heating bars.

16. The toaster according to claim 1, including another heating bar, said field extending upward from a midway point of a height of said heating bars over an angle of approximately 60° to 90° around said heating bars.

17. The toaster according to claim 1, including another heating bar, said field extending upward from a midway point of a height of said heating bars over an angle of approximately 75° around said heating bars.

18. The toaster according to claim 1, wherein said shielding bars are spaced apart by approximately 0.7 to 2.5 times the thickness of said shielding bars.

19. The toaster according to claim 1, wherein said shielding bars are spaced apart by approximately the thickness of said shielding bars.

20. The toaster according to claim 1, wherein said shielding bars are spaced apart by spacings increasing upward from a midway point of the height of said heating bar.

21. The toaster according to claim 1, wherein said shielding bars are spaced apart by spacings increasing downward from the midway point of the height of said heating bar.

22. The toaster according to claim 1, including other heating bars, and ceramic support elements for said heating bars, said support elements having receptacles for securing said shielding bars.

23. The toaster according to claim 1, wherein said shielding bars are hollow.

24. The toaster according to claim 1, wherein said shielding bars are tubular.

* * * * *